(12) United States Patent
Christopher

(10) Patent No.: US 9,742,916 B1
(45) Date of Patent: Aug. 22, 2017

(54) CUSTOMER SERVICE AGENT TO CUSTOMER CONNECTION

(71) Applicant: Amazon Technologies, Inc., Reno, NV (US)

(72) Inventor: Keian Christopher, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/135,340

(22) Filed: Dec. 19, 2013

(51) Int. Cl.
*H04M 3/00* (2006.01)
*H04M 3/51* (2006.01)

(52) U.S. Cl.
CPC .................... *H04M 3/5183* (2013.01)

(58) Field of Classification Search
CPC ............. H04M 3/5191; H04M 3/5183; H04M 3/5166; H04M 3/5175; H04M 3/5232; H04M 3/523; H04M 3/5133; H04M 3/5233
USPC ............. 379/265.01–265.02, 265.09, 266.01
See application file for complete search history.

(56) References Cited

U.S. PATENT DOCUMENTS

| | | | | |
|---|---|---|---|---|
| 5,991,394 A * | 11/1999 | Dezonno | ................ | H04L 29/06 370/352 |
| 7,542,561 B1 * | 6/2009 | Jabbour | .............. | H04M 3/5232 379/265.01 |
| 2002/0128875 A1 * | 9/2002 | Parry | .................... | G06Q 30/02 705/4 |
| 2009/0253399 A1 * | 10/2009 | Snapp | ........................ | 455/404.1 |
| 2014/0153707 A1 * | 6/2014 | Rais | .................... | H04M 3/5232 379/196 |
| 2014/0369485 A1 * | 12/2014 | Hollander | ......... | H04M 3/42008 379/265.02 |

* cited by examiner

*Primary Examiner* — Rasha Al Aubaidi
(74) *Attorney, Agent, or Firm* — Thorpe North & Western, LLP.

(57) ABSTRACT

Technology for connecting a customer with a customer service agent is provided. In one example, a method may include receiving an initial request from a customer to connect with customer service. A connection may be created between the customer and a customer service agent for the customer service. Customer information for the customer may be linked with agent information for the customer service agent for a predetermined period of time. When a subsequent request to connect the customer with the customer service is received within the predetermined period of time, the customer may be connected with the customer service agent using the linking of the customer information with the agent information.

18 Claims, 7 Drawing Sheets

FIG. 3A

Customer Support http://www.example.com

305  Contact Us  Keian's Account

| What can we help you with? | Tell us more about your issue | How would you like to be contacted? |
|---|---|---|
| ☐ Order Status<br>☐ Product Support<br>☐ Technical Support<br>☐ Returns<br>☐ Other    310 | 315 | ☐ Telephone<br>☐ Email    320<br>☐ Chat<br>☐ Video Call<br>☐ Text Message |

FIG. 3B

Customer Support http://www.example.com

305  Contact Us  Keian's Account

| What can we help you with? | Tell us more about your issue | How would you like to be contacted? |
|---|---|---|
| ☐ Order Status<br>☐ Product Support<br>☑ Technical Support<br>☐ Returns<br>☐ Other    310 | My tablet computer won't turn on when I press the power button....  315 | ☑ Telephone<br>☐ Email<br>☐ Chat    320<br>☐ Video Call<br>☐ Text Message |

325 ☑ Check here if this is a continuation of a previous issue and you'd like to be connected to the same customer service agent as before.

CUSTOMER SERVICE AGENT TO CUSTOMER CONNECTION

BACKGROUND

Many companies provide call centers or outsource to call centers with trained customer service professionals who help customers resolve problems associated with products and/or services provided by the companies. Customers may be dispersed throughout the world, and call centers may be located at various locations around the world. Customer support is generally considered an important aspect of customer service. An appliance manufacturer or an appliance retailer, for instance, may provide support to customers with respect to an appliance. A user of the appliance may not know how to properly use the functionality of the appliance, or may have a faulty or otherwise dysfunctional appliance. A customer service agent may be employed by the retailer to help users with issues they may have with the appliance. With effective customer support, a customer's experience with the product and/or the company from which the product was purchased may be enhanced and future business maybe more readily assured.

Effective customer support may go beyond simply determining whether a customer's issue has been resolved. For instance, effective customer support may include reducing customer effort, discerning valuable customer feedback and lowering the occurrence of customer frustration. Customer support may often cost companies significant amounts of money, and companies therefore, generally attempt to balance ideal customer support against the costs to provide such support. Various customer service technologies provide for online customer support or call centers in which a request for customer support is directed to a next available customer service agent. However, customers who may have an ongoing issue with multiple contacts with customer support may not wish to explain a situation multiple times to multiple different customer service agents to receive assistance.

BRIEF DESCRIPTION OF THE DRAWINGS

FIGS. 3A-3B illustrate graphical user interfaces for a customer to request to connect with a customer service agent in accordance with examples of the present technology.

DETAILED DESCRIPTION

Figure 1:
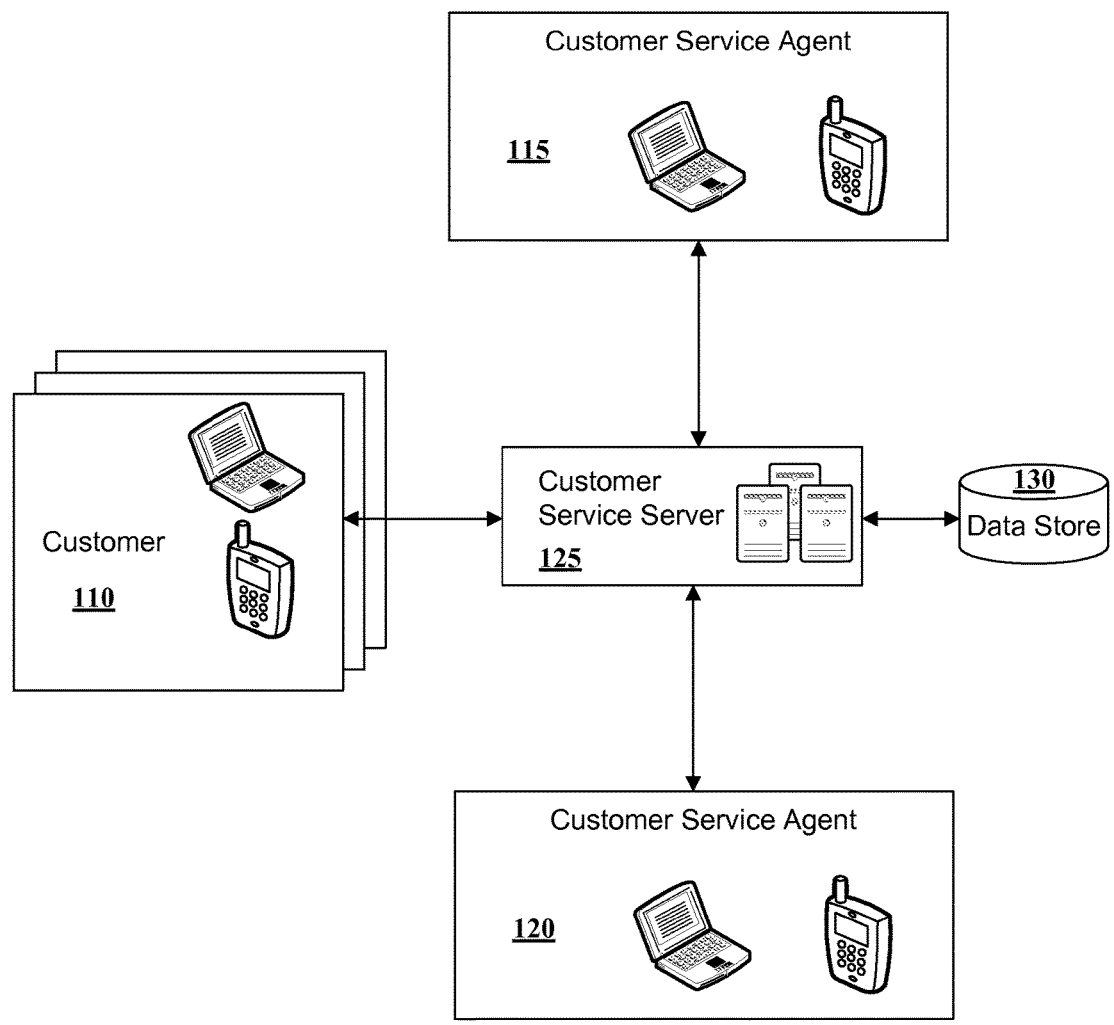
FIG. 1 is a schematic overview of a system for connecting a customer with a customer service agent in accordance with an example of the present technology.

Technology for connecting a customer with a customer service agent is provided. In one example, a method may include receiving an initial request from a customer to connect with customer service. For example, a request may be received from a customer through a networked site via a browser. As a result, a connection may be created between the customer and a customer service agent in order to provide the customer service. Then the customer may communicate with the customer service agent to receive customer service. Customer information for the customer may be linked with agent information for the customer service agent for a predetermined period of time. When a subsequent request is received to connect the customer with customer service within the predetermined period of time, the customer may be connected with the same customer service agent using the information linking the customer information with the agent information.

In an example configuration, a method may include receiving an initial request from a customer over a computer network to connect with a customer service. The initial request may have been electronically submitted and received via a graphical user interface for the customer service. For example, the customer may identify one or more general or specific issues or topics for which customer support is desired. Once the request is received, a connection may be created between the customer and a customer service agent for the customer service. For example, the connection may originate from the customer service agent and may facilitate an audio communication between the customer and the customer service agent. In other words, a customer service agent may call, instant message, or otherwise contact the customer in response to the initial request. Customer information for the customer may then be linked with agent information for the customer service agent for a predetermined period of time. Example customer or customer service agent information may include a phone number, an email address, an identifier, a name, an account or any other suitable information to identify a customer or customer service agent.

When a subsequent request is received within the predetermined period of time, the customer may again be connected with the customer service agent directly using the linking of the customer information with the agent information. When a repeat contact is made within a predetermined period of time, an assumption may be made that the issue for which the customer is making the subsequent request is related to the issue for which the customer made the initial request. For example, if a customer makes a subsequent request to customer service again within 24 hours of an initial request, then an assumption may be made that both requests are about the same topic. Connecting the customer to the customer service agent associated with the initial request may ensure a higher quality of service for the subsequent request and greater customer satisfaction because the customer service agent is already familiar with the issue and the customer is already familiar with the customer service agent.

Reference will now be made to FIG. 1. FIG. 1 illustrates an overview of an example process by which a customer 110 requests and receives customer support from a customer service agent 115, 120 via a customer service server 125 for an entity, such as a business. FIG. 1 illustrates multiple devices for each of the customers 110 and the customer service agents 115, 120, including a telephone and a computing device. However, one or more of the customers 110 or the customer service agents 115, 120 may use a lesser or greater number of devices in requesting and/or facilitating communication between the customers 110 and the customer service agent(s) 115, 120.

In this example, a customer 110 may use a computing device, such as a laptop, desktop, smartphone or any other suitable computing device to send a request to the customer service server 125 to request contact with a customer service agent 115. For example, the customer 110 may visit an electronic page (e.g., web page) for the business and input information related to the customer 110 and/or the issue for which customer support is being requested via a graphical user interface.

The customer service server 125 illustrated may be a computing service for managing data related to customers and customer service agents 115, 120 and may further be configured to route requests for customer support to customer service agents 115, 120. The customer service server 125 may route voice or data to connect customers with the customer service agents 115, 120. For example, requests for assistance with shipping and returns may be directed to a different customer service agent 115, 120 than requests for technical assistance with technology items and so forth. Furthermore, the customer service server 125 may track availability of customer service agents 115, 120 to connect the customer 110 with an appropriate customer service agent 115, 120 in a minimal time to reduce a wait time of the customer 110 for receiving the customer support. Tracking the availability of customer service agents 115, 120 may also be useful in re-connecting a customer to a customer service agent, as will be described in additional detail later.

The customer service server 125 may connect the customer 110 with a customer service agent 115, 120 in any of a variety of ways. For example, the customer 110 may be connected with the customer service server 125 via the customer's computing device and the customer service server 125 may connect to a computing device of a customer service agent 115, 120 and form a bridge for a connection between the customer 110 and the customer service agent 115, 120. The customer 110 and the customer service agent 115, 120 may then communicate using audio, video, text, graphics, etc., or any combinations thereof.

In one example, the customer service server 125 may connect a customer service agent 115, 120 to the customer 110 by selecting a customer service agent 115, 120 when the customer 110 is not connected to a customer service agent 115, 120 or when the connection is to be made using a different type of connection than by which the request was received. More specifically, the customer 110 may submit the request using the computer and shortly thereafter, the customer service server 125 may connect to a customer service agent 115, 120 and cause a telephone of the customer 110 to ring to connect the customer service agent 115, 120 with the customer 110. In yet another example, rather than making the connection between the customer service agent 115, 120 and the customer 110, the customer service server 125 may simply pass contact details received from the customer 110 to the selected customer service agent 115, 120 to allow the customer service agent 115, 120 to initiate the telephone call to the customer 110. Any of a wide variety of implementations for connecting the customer 110 and the customer service agent 115, 120 may be used which may differ from those explicitly described or illustrated, as may be understood by one of ordinary skill in the art of call centers and customer support services.

According to the present technology, a connection between the customer 110 and the customer service agent 115, 120 may be terminated at some point and the customer 110 may subsequently desire to contact customer service via the customer service server 125, or more specifically may desire to contact the customer service agent 115, 120 with whom the customer 110 previously discussed a matter. To facilitate this re-connection, the customer service server 125 may link the customer 110 and the customer service agent 115, 120 when the initial connection is created using customer information and customer service agent information. For example, the customer service server 125 may store a customer identifier and a customer service agent identifier together in a linking data store 130 as a linked pair. When the customer 110 initiates a subsequent request to the customer service server 125, the customer service server 125 may search the linking data store 130 for the customer information to identify whether the customer 110 is linked to a customer service agent 115, 120 and may connect the customer 110 to the customer service agent 115, 120 when the linked pair is found.

The customer service server 125 may store the linked pair with a time stamp indicating a creation time of the linked pair. A predetermined time period for expiring the link between the customer 110 and the customer service agent 115 may be set from the initial request or initial connection, represented by the time stamp. If the customer 110 submits a subsequent request for customer support within the predetermined period of time, the customer 110 may be connected to the customer service agent 115 who was contacted for the initial connection. If the customer 110 submits a subsequent request for customer support after the predetermined period of time has expired, the customer 110 may be connected to a suitable customer service agent 115, 120 without limitation to the customer service agent 115 for the initial connection. In other words, where the time period has expired, the customer service server 125 may simply access available customer service agents 115, 120 for the appropriate matter or context and may connect the customer 110 to an available customer service agent 115, 120. The available customer service agent 115, 120 may or may not be different from the customer service agent 115, 120 for the initial connection. The customer service server 125 or the linking data store 130 may periodically review the time stamps of the linked pairs stored in the linking data store 130 and may remove or delete linked pairs with a time stamp older than the predetermined period of time.

In some examples, a customer 110 may request customer support within the predetermined period of time, but may have a different issue. For example, the initial request may have been to return a defective item. A replacement item may have been shipped to the customer 110 and the customer 110 may have questions about the operation of the replacement item. In the subsequent request, if the customer 110 specifies a different type of matter or issue than was specified for the initial request, the customer service server 125 may search the linking data store 130 for a linked pair and, if a linked pair is unavailable for the specified issue, then the customer service server 125 may connect the customer 110 to an available and appropriate customer service agent 115, 120. In other words, along with the customer information and the customer service agent information, the customer service server 125 may store issue information in the linking data store 130. If a linked pair is found, but for a different issue, the customer 110 may not be connected to the customer service agent 115, 120 associated with the linked pair even if the subsequent request is within the predetermined period of time. A new linked pair may instead be created for the new issue. In other words, customer 110 may be linked to a first customer service agent 115 for a first issue and may concurrently be linked to a second customer service agent 120 for a second issue.

The customer service server 125 may further consider other contextual information when determining whether to connect the customer 110 with the customer service agent 115 from the initial request. Some examples of contextual information may include the passage of time, other intervening requests for customer support, customer activity since the initial connection and so forth. For example, the greater the amount of time between the initial request and the subsequent request, the less likely the subsequent request is to be related to the initial request. Likewise, the shorter the duration of time that has passed between the initial request and the subsequent request, the more likely the subsequent request is to be related to the initial request. As another example, if a customer 110 has contacted customer service for customer support for a technical support issue for a first technology device and then subsequently purchased a second technology device and submitted a subsequent request after the second technology device has been delivered to the customer 110, an assumption may be made that the subsequent request is for the second technology device and is unrelated to the initial request and a different customer service agent 115, 120 may be selected for the subsequent request than was selected for the initial request. However, if the order has been placed for the second technology device but the second technology device has not yet been delivered to the customer 110, then an assumption may be made that the subsequent request is related to the initial request.

Contextual information may provide a weighting factor by which subsequent requests may be determined to be more or less likely related to previous requests. Using the passage of time as an example, subsequent requests may be highly likely to be related to the initial request if received within minutes of the initial request, and a short duration of time may thus be weighted heavily in favor of the relation to the initial request. A subsequent request received days after the initial request may be weighted less than the subsequent request received within minutes. As time continues to pass, the weighting may gradually diminish until there is substantially no weighting factor and the linked pair may be expired. Weighting may be tied in to any number of factors, such as time, intervening orders, intervening customer support requests, devices or phone numbers from which support requests were received, demographic or other customer profile information and/or any number of other factors.

The present technology may simplify a customer support experience for customers. For example, if a customer 110 contacts the customer service server 125 with an issue and then explains the issue in detail to a customer service agent 120, the present technology may enable the customer 110 to avoid navigating a phone tree or similar routing technology, and may enable the customer 110 to avoid having to start a resolution process over with a new customer service agent 120. The present technology may further enable customers to re-connect with customer service agents 115, 120 familiar with the customer's issue, such as if the problem recurs or if the connection between the customer and the customer service agent is poor or is lost.

As an example implementation of the present technology that further specifies how the technology may be implemented, the technology may be implemented using short-lived or temporary phone numbers or phone extensions that may be used to connect the customer directly 110 with the customer service agent 115 with whom the customer previously communicated, or the technology may track which customer phone numbers are associated with which customer service agents so that although different customers may call a same phone number, internal routing may be used to route the calls to the appropriate customer service representatives associated with previous calls based on the customer's phone number or other identifying information.

While reference is made herein to phone numbers, a phone number may be understood to include a conventional phone number, a phone extension, a phone code, or other phone identifier suitable, or any combination thereof, for use in creating a telephone connection.

Figure 2:
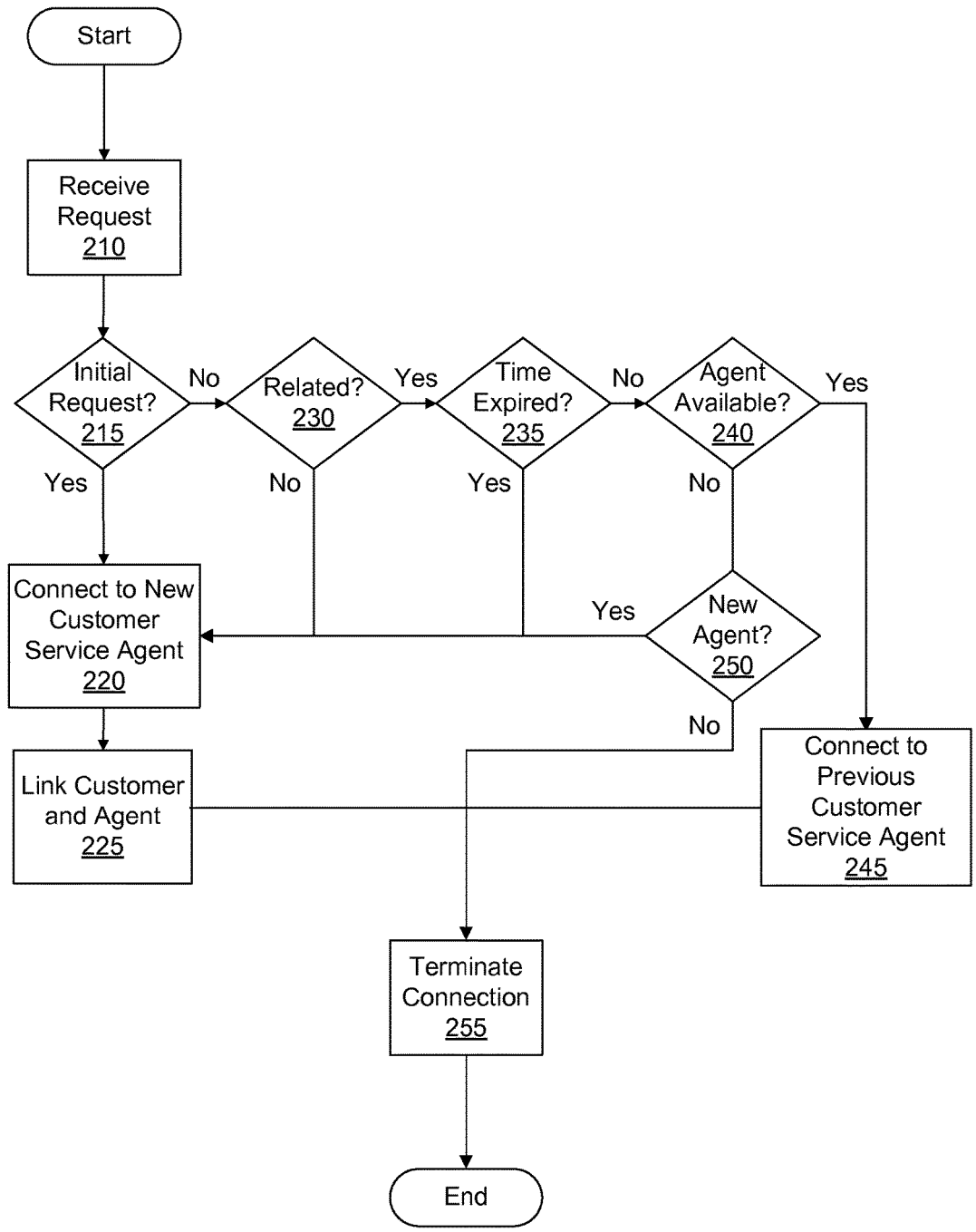
FIG. 2 is a flow diagram for connecting a customer with a customer service agent in accordance with an example of the present technology.

Referring to FIG. 2, a decision diagram illustrates a flow of a process for connections between a customer and a customer service agent, such as the connections described with respect to FIG. 1, for example. In this illustration, a request may be received 210 from a customer for customer support. The request may be received at a customer service server and may request a connection between a customer service agent and the customer. The customer service may determine whether the request is an initial request at block 215. In other words, the customer service may determine whether the customer has previously requested customer support or whether the customer has previously requested customer support for a particular issue more specifically. If the customer has not previously requested customer support or if the issue for which customer support is requested is different than a previously request (at least within the predetermined period of time), then the customer service may establish a connection between the customer and a new customer service agent at block 220, such as by requesting the customer service agent to make a telephone call to the customer, by routing a customer phone call to the customer service agent, or creating a telephone connection to both the customer service agent and the customer and then bridging the connection, for example. When a connection between the customer and the customer service agent has been established, the customer and agent information may be linked for use in subsequent requests as at block 225.

If the request for customer support is not an initial request, the request may be a subsequent request. The customer service may determine whether this subsequent request is related to the initial request received previously at block 230. For example, if the customer indicated that the initial and subsequent requests were both for health and beauty product support, then the subsequent request may be identified as likely related. Where the requests are likely to be related, the customer may be connected to the same customer service agent who serviced the initial request. However, if the initial request was for health and beauty product support but the subsequent request is for multimedia product support, then the requests may be identified as likely to be unrelated. If the requests are likely to be unrelated, the customer may be connected to a new customer service agent.

If the initial and subsequent requests are likely related, the customer service server may determine whether the predetermined period of time for linking the customer to a customer service agent has expired at block 235. If the predetermined period of time has expired, the customer may be connected to a new customer service agent. If the predetermined period of time has not expired, then the customer service server may determine whether the customer service agent linked to the customer is available at block 240. If the customer service agent is available, the customer service server may connect the customer and the customer service agent to facilitate the requested customer support at 245.

If the customer service agent is unavailable, such as if the customer service agent is on another call or is not at work when the subsequent request is received, then the customer service may prompt the customer to indicate whether he or she would like to wait for the customer service agent to become available (such as if the customer service agent is providing customer support to a different customer; e.g., proceed to block 245), whether he or she would like to speak to a different or new customer service agent at block 250 (e.g., proceed to block 220), whether he or she would like a call back from the customer service agent when the customer service agent is available (e.g., proceed to block 245), or whether he or she would like to try again at another time (e.g., proceed to block 255). If the customer selects to wait, then the customer service server may connect the customer to the customer service agent when the customer service agent becomes available at block 245. If the customer opts to speak to someone else at block 250, the customer service server may connect the customer to a new customer service agent at block 220. If the customer opts to try to connect to the customer service agent another time, the connection between the customer service and the customer may be terminated at block 255.

When the customer connects for the initial customer service session (i.e., with a new customer service agent), the linking data store may be updated accordingly. For example, when the customer connects with a new customer service agent, a linked pair may be created in the linking data store. When the customer connects with the initial customer service agent, the linked pair may be updated with an updated time stamp and the predetermined period of time for connecting the customer and the customer service agent may be determined from the updated time stamp.

In some examples, a customer or a customer service agent may wish to remain unlinked to one another, such as if the customer was unhappy with the customer support received or if the customer service agent did not wish to deal with an irritable customer again. In such an example, the customer service server may enable the customer or the customer service agent to indicate a preference to avoid re-connecting with one another. A default may be to enable re-connection when within the predetermined period of time. However, the customer service agent may be allowed to disable re-connection following the initial connection. Similarly, the customer may be enabled to opt out of re-connection when submitting the subsequent request.

When re-connection is disabled, a linked pair in the linking data store may be: marked to disable re-connection, deleted, removed, expired or otherwise modified to indicate the preference for no re-connection. Modification or expiration of a linked pair may result in data be removed or deleted. However, the data may optionally be stored in the linking data store indefinitely, but may not be used in creating connections between customers and customer service agents when a linked pair is expired, broken or otherwise indicated to not be used for creating a connection. Rather, the data in the linking data store may provide historical data that may be data mined for trends, habits, and other data useful in improving customer support, training customer service agents and so forth.

When the customer service agent has completed providing the customer support to the customer, the connection may be terminated at 255, at least until such time as the customer submits the subsequent request. In another example, the connection may remain active while the customer submits the subsequent request, such as if the initial request was to provide product support for a tablet computing device and the subsequent request is to enable the customer service agent connected by the initial request to connect to the tablet to further enhance the customer support provided. In another example, the connection may be terminated even though the customer service agent has not completed providing customer support to the customer, such as to test whether instructions provided to the customer resolve the issue. For instance, the customer may be having issues with a tablet, phone or other device for which the customer has contacted the customer service agent. Instructions for resolving the issues may include rebooting the device, which may necessarily terminate the connection. The subsequent request may be submitted once the reboot process is complete.

In an example where a customer support agent provides a workflow to fix a malfunctioning device, after certain steps of the workflow have been performed, the connection may be terminated, such as by a device reboot. When the connection is re-established through a subsequent request, the steps of the workflow, such as suggestions for troubleshooting, which have already been suggested or performed may be remembered from the initial connection such that the suggestions are not again presented to the customer in order to avoid causing additional frustration and confusion. In some examples, when a device is powered off, whether the initial connection has been made from the powered-off device or not, a connection may be terminated at least for a short time to allow for rebooting and any other troubleshooting or testing steps. When the device is again powered on and has re-established network access, the device may optionally notify the customer service server or more specifically the customer service agent, that the device is back online and ready for further troubleshooting or ready to receive a connection from the customer service agent. In one example, either before or after a request and/or connection, the customer service server or a customer support service may proactively monitor a device from which the customer is connecting or for which the customer is requesting support in order to identify potential issues before establishing the connection with the customer or to identify whether previous issues have been resolved. Monitoring may be performed for a set period of time, and may be based on one or more potential issues identified by the customer. When identifying whether previous issues have been resolved, a subsequent connection may be made when issues are not resolved or when new issues are discovered. When issues are resolved or new issues are not discovered, a subsequent connection may be unnecessary, but may optionally be made to ensure customer satisfaction with the resolution. Monitoring may be performed with or without the customer's explicit knowledge.

Referring now to FIG. 3A, an example of a customer support user interface 305 is illustrated. The customer support user interface as depicted may include a page rendered within a browser or another electronic application. The page may be a "Contact Us" page for an electronic retailer or a support page associated with delivery of an electronic service (e.g., video conferencing or cell phone support) or electronic item (e.g., an eBook or video item). The page may ask the customer what the electronic retailer may help the customer with at 310. For example, the page may prompt the customer to choose an order related to the customer's product support issue if the "Order Status" or "Returns" options are selected. In another example, a button may be used to pop up an order selector in which the customer may be able to select from several different orders. Once an order has been chosen, information regarding the order may be provided on the page. The page may also include a text section 315 that prompts the customer to tell more about the issue by entering information into a freeform text field or text editing control.

The page may include a contact area 320 to initiate contact with a company or customer service agent for product support, technical support or the like. This may reduce customer frustration in the event that the set of results are ineffective at resolving the customer's issue. The customer may conveniently select a method of contact by which the customer desires to be contacted. For example, the customer may select to be contacted by telephone, email, chat (e.g., instant message), video call, text message, etc. Alternatively, the customer may be provided with an option to select a method to enable the customer to contact the customer service server. Customer account information may be used in combination with the information entered in the "Contact Us" page to provide useful information to a customer service agent in resolving issues and in linking the customer to the customer service agent for subsequent customer support requests, as has been described previously. In this context, if a customer has a telephone number on record and selects to be contacted by telephone, the customer service server may connect the customer with a customer service agent using the telephone number on record, optionally with a prompt for the customer to confirm the use of the telephone number.

When a product support request is a subsequent request, a user may select an option 325 to indicate that the request is a subsequent or follow-up request, as illustrated in FIG. 3B. The user may optionally indicate a desire to connect to the same customer service agent with whom connection was made previously. When the customer indicates that the request is a follow-up request, various details of the previous request may optionally be automatically populated in fields 310, 315, 320, as illustrated in FIG. 3B. When a customer has made multiple previous requests, the customer may select a previous request from a list as a basis for the subsequent request and/or a basis for populating details from the previous request. The customer may be able to confirm that the information is accurate before submitting. In one aspect, the information may be for confirmation by the user but not for submission unless a change is made since the information has been previously submitted. In another aspect, the information may be re-submitted for consideration by the customer service agent, which may be beneficial if the customer ends up connecting with a new customer service agent, for example.

The customer service server or controller may comprise an automated dispatch system to manage the routing and establishing of connections between the customers and the customer service agents. When a new request from a customer is received, the request may be associated with a particular service category. The service category may have been selected by a customer, or may be determined by the customer service server based on information already known about the customer and/or based on information received from the customer. For example, a customer may indicate that the customer is experiencing a particular problem. When the request is submitted by phone call, the customer may select the problem from a voice menu. For IM (instant message) connections, the customer may select the problem from a dropdown menu prior to or during establishment of an IM session. Alternatively, the customer may speak the problem into the phone, or may type the problem into a text box. In response, the customer service server may use a natural language processing engine to determine a service category based what the customer said or typed. The natural language processing engine may also be used to parse the contents of customer email messages to determine a service category.

In one embodiment, the customer service server may include a machine learning engine that predicts a service category for a customer based on information on hand about the customer. The information may include recent activity of the customer (e.g., on the company's web site), a purchase history of the customer with the company, demographic information about the customer, and so on. The machine learning engine may work in combination with the natural language processor associated with the previously described query engine to determine a service category. Examples of service categories include online transaction, order management, electronic products, digital content, and so on. Any number of service categories may be used, and the service categories may be based on the services and/or products of a particular company.

Different customer service agents may be associated with different service categories. For example, one customer service agent may be trained to handle customer inquiries regarding online transactions, another customer service agent may be trained to handle customer inquiries regarding digital content, and yet another customer service agent may be trained to handle customer inquiries regarding order management. Each of these customer service agents may be associated with the same or a different call center. In one embodiment, particular call centers are associated with particular service categories. For example, customer service agents at a particular call center may be trained to handle customer inquiries regarding movie streaming or other digital content.

The customer service server may connect customers to customer service agents that are trained to handle the particular issues that the customers are facing. For example, if the customer indicated that he is having a problem playing a streamed movie, then the customer service server may route a connection for that customer to a customer service agent trained to handle digital content issues.

In one embodiment, the customer service server may perform load balancing for customer service server connections. The customer service server may utilize information on capacities of different call centers to handle different types of customer issues. Such information may indicate capacities of these call centers over time. For example, capacities of some call centers may increase during the weekend and decrease during the week, or may increase at certain hours and decrease at certain hours. The customer service server may utilize rules that indicate how to route connections to call centers. Such rules may take into account the capacities of the call centers at any given time. In an example, a load balancing rule may specify that 30% of digital content issues are to be routed to a first call center between 3:00 GMT and 12:00 Greenwich Mean Time (GMT), and that 70% of digital content issues are to be routed to a second call center between 3:00 GMT and 12:00 GMT. This load balancing rule may be based, for example, on information indicating that at these times the second call center has over twice the capacity of the first call center.

The customer service server may additionally include a priority queue. The customer service server may route a customer to a particular call center, where that customer will be connected to a first available customer service agent of the particular call center who is trained to handle the problem that the customer is having. However, if no customer service agent from that call center connects to the customer within a predetermined time period (e.g., 30 seconds from when the customer initiated contact), then the customer service server may add that customer to the priority queue. Once a customer is in the priority queue, any customer service agent worldwide trained for the service category at issue may respond to the customer, regardless of the call center with which the customer service agent is associated. The priority queue may also be used for subsequent requests that are related to prior requests. In other words, if a customer is requesting additional support regarding an issue for which customer support was previously requested, and particularly if the customer is to be connected with a same customer service agent with whom connection was made previously, the customer may be prioritized in the queue for the customer service agent over other calls that may otherwise be directed to the customer service agent.

Figure 4:
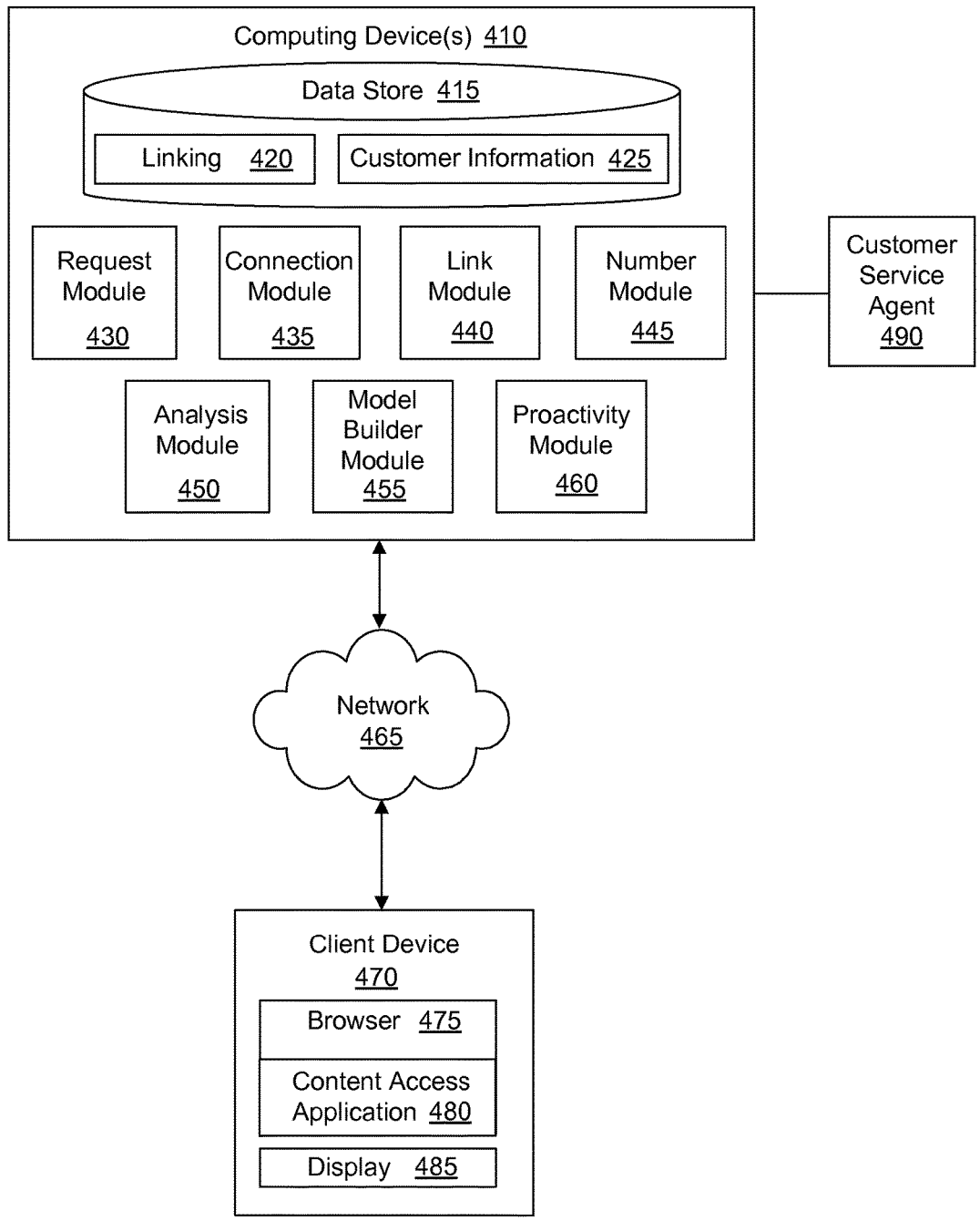
FIG. 4 is a block diagram of a system for managing customer service agent to customer connections in accordance with an example of the present technology.

Referring now to FIG. 4, a block diagram of a system for managing customer to customer support agent connections is illustrated in accordance with an example of the present technology. The system may be implemented using one or more computing devices 410, such as a server for example, and/or client devices 470 and may be implemented using or across a network 465. The system may include a data store 415 and a number of modules 430, 435, 440, 445, 450, 455, 460 for storing and processing customer and customer service agent data.

The system may include a request module 430 to receive an initial request from a customer to connect with a customer service agent 490. While in some examples, the request module 430 may receive the initial request from the customer, in alternative examples, the request module 430 may receive the request from the customer service server. For example, based on customer interaction with a web page, a device, etc., the customer service server may identify that the customer may benefit from customer support using a customer service agent 490. More specifically, a customer may be repeatedly performing a same action, such as trying to accomplish something that is not working. As another example, the customer may have clicked a purchase button multiple times attempting to complete an order and not intended to place multiple orders. In such examples, the customer service server may proactively contact the customer, such as through the device being used or using a phone number or other contact information on record, and connect the customer to a customer service agent 490 to attempt to resolve the issues the customer is experiencing.

The system may include a connection module 435. The connection module 435 may be configured to create a connection between the customer and a customer service agent 490. The customer service agent 490 in this illustration may represent a device to which a connection is made or may represent a human. The connection module 435 may, for example, initiate a telephone call, initiate a chat session, initiate a video connection, provide a notification on a mobile device and so forth to create the connection.

Once the connection has been created, a link module 440 may be used to link customer information for the customer with agent information for the customer service agent 490. The link module 440 may link the customer and customer service agent information for a predetermined period of time. In other words, the link module 440 may associate a time stamp with the linked information. The time stamp may represent a time from which the predetermined period of time may extend until expiration of the link or the time stamp may represent the expiration. Different service categories or customer support issues may be associated with different periods of time for the expiration of the link. The period of time for a particular link may be set when the initial request is received or may be set at the conclusion of the initial connection, such as based on identification of the categories or issues involved. In one example, the customer service agent 490 may input or modify a period of time for a given link rather than accept a default period of time. The connection module 435 may connect or "re-connect" the customer with the customer service agent 490 when a subsequent request is received within the predetermined period of time.

The system may include a number module 445. The number module 445 may be configured to create telephone numbers or to manage assignment of existing telephone numbers. For example, disposable phone numbers, phone extensions or phone codes may be readily created using the number module 445 for each customer that submits a customer support request (e.g., by calling customer support, submitting an online request, etc.). The disposable phone number or phone codes may be a phone number or phone code that was not in use at the time the connection between the customer and the customer service agent 490 was made. The disposable phone number may not actually be 'created', but rather requested from a phone company for use by the system. Each customer may be assigned a separate phone number or phone code. At the conclusion of the customer support and before the connection is terminated, the disposable phone number or phone code may be provided to the customer to use in contacting the customer service agent 490 directly. The disposable phone number or phone code may be stored in the linking data store with the customer and customer service agent information. In one aspect, the disposable phone number or phone code may include at least a portion of the customer service agent information. When the customer calls the disposable phone number or phone code, the customer may be directly connected to the customer service agent through the system, assuming the customer service agent is at work and not on another call. When the predetermined period of time expires, the disposable phone number may be dissociated from the customer service agent and may be disconnected such that attempts to contact the customer service agent 490 using the disposable phone number or phone code will fail.

In another example, rather than using disposable phone numbers or phone extensions, the number module 445 may manage association or assignment of phone numbers, phone extensions or the like with customer service agents. Phone numbers may be non-permanently assigned to customer service agents for a period of time, for particular customer support session, or for a particular customer. The electronic retailer may own or have access to a block of phone numbers which are not permanently assigned to any particular customer service agent. When a customer is connected with a customer service agent, the number module may assign a phone number to the link between the customer and the customer service agent. The phone number may be used by the customer to re-connect with the customer service agent if the phone number is used within the predetermined period of time. After the predetermined period of time has expired, the telephone number may be dissociated from the customer service agent. If the phone number is used after the predetermined period of time has expired, the customer may receive notification that the phone number is invalid or may not be used to directly contact the customer service agent due to the expiration. Alternatively, a telephone call placed using the phone number may be redirected to general customer support or another suitable department if the predetermined period of time has expired.

In the disposable phone number example, a phone number may be assigned to a particular customer service agent for a period of time, such as for a week or two, during which time the customer may be able to re-connect with the customer service agent. However, in this embodiment, customers connecting with the customer service agent near the end of the predetermined period of time may have less opportunity to re-connect than customers connecting with the customer service agent near the beginning of the predetermined period of time. One method for reducing the inconvenience for later calling customers would be to use multiple phone numbers per customer service agent. For example, a customer service agent could have one phone number that is used and distributed on Monday and remains valid for contacting the customer service agent for two weeks, another that is given out on Tuesday, another on Wednesday, and so forth.

In another example, the customer support agent may have a permanent phone number assigned, and each customer support agent may have a different, unique phone number. The customer service agent may give the phone number to the customer for use for subsequent related issues. The linking data store may store the date on which the customer connected with the customer service agent. When the customer uses the phone number, the system may identify the customer by a customer phone number obtained through caller ID (identification) or by prompting the customer to input identifying information. The system may verify whether the predetermined period of time has expired by referencing the linking data store and may connect the customer to the customer service agent if the predetermined period of time has not expired. If the predetermined period of time has expired, then the customer may be redirected to general customer support or other suitable department.

In another example, customer support agents may not have a direct phone number to provide to customers. However, the system may identify the customer, such as through caller ID, email address or the like, and may evaluate recent customer support connections to determine whether there is a predetermined period of time that has not expired for a customer to re-connect to a linked customer support agent. If the issue is likely related to a previous issue and the predetermined period of time is unexpired, then the system may directly connect a customer to the customer service agent from the previous connection when the customer calls a general customer support phone number or otherwise submits a request to connect by email or other methods.

In one example, a customer support connection may be escalated during a course of the session, such as by transferring a telephone call from a customer service agent to a supervisor. In this case, the link may remain between the customer and the initial customer service agent or the link may optionally be modified to link the customer to the supervisor. When the link is modified, the supervisor may be contacted by the customer for subsequent requests rather than the customer service agent.

In another example, an initial or subsequent connection of a customer with a customer service agent may include an in-person communication facilitated by notifying the customer service agent via mobile device or the like to visit the customer. While the present technology may enable connection of a customer to a customer service agent with whom the customer previously had an interaction, the present technology may enable a customer to be connected with an appropriate customer service agent, which may be the previous customer service agent or a different agent. For example, after a television has been installed, if the customer contacts a customer service agent by telephone regarding an issue with the television, a television support agent may be dispatched to visit the customer in person as a follow-up to resolve the issue. As another example, after a television has been installed by a television support agent and the customer has an issue with the television, the same television support agent that installed the television may be dispatched to visit the customer to resolve the issue. If the customer has not previously had a connection with the in-person customer service agent, then an appropriate customer service agent may be selected such as by identifying a proximally or physically near customer service agent. In the case of a retailer managing customer support services, customer service agents connected with customers whether in-person, over the telephone or through any other connection may be associated with or employed by the retailer or may be third-party contractors providing customer support at the request of the retailer.

In one example the customer service server may store and identify various details regarding customer service agents or customer service agencies available to provide in-person customer support to customers, including one or more of the following example items:

- the name and address of the customer service agent/agency;
- that the customer service agent/agency holds the appropriate licenses to provide services (e.g., city-, county-, state-, or federal-level licenses);
- that the customer service agent/agency has appropriate insurance coverage for practicing the services;
- that the customer service agent/agency has the appropriate registrations (e.g., city-, county-, state-, or federal-level registrations, industry registrations, etc.); and/or
- a geographical location in which the customer service agent/agency operates, including detection of a present geographical location to ensure a timely response for time-sensitive customer service requests.

In another example, a link between a customer and a customer service agent may be established through an email communication connection. For example, the customer may email a general customer support email address and receive a reply from a specific customer service agent. A link may be created between the customer and the customer service agent, such as based on the email address of the customer or a matter identification number or the like. When the customer sends a subsequent email, such as to the general customer support email address, the subsequent email may be routed to the previous customer service agent based on the link from the previous connection. The link may be time-sensitive and may expire, as has been described with regards to other examples herein. If the subsequent email (request) is sent outside of the predetermined period of time or is unrelated to the initial request, then the subsequent email may be routed to an appropriate customer service agent.

The system may include a proactivity module 460. For example, the proactivity module 460 may be used to proactively contact customers whose actions indicate the customer is likely in need of customer support. The proactivity module 460 may further be used to submit the subsequent request to re-connect the customer with the customer service agent. For example, if the customer is experiencing device issues with the device used to connect with the customer service agent and the call is terminated to troubleshoot the device, the proactivity module 460 may contact the customer and connect the customer with the customer service agent after a period of five or ten minutes or so if the customer has not already re-connected with the customer service agent. As another example, the proactivity module 460 may be used to follow-up with customers who experienced issues after a predetermined period of time, such as a week, for example, to ensure that the issues have been resolved and to answer any questions or concerns the customer may have. As another example, the proactivity module 460 may be used to proactively monitor a device of the customer within the predetermined period of time for issues, such as has been described previously.

The data store 415 may include, for example, the linking data store 420. The linking data store 420 may include links between customers and customer service agents as well as various information suitable for linking the customer with the customer service agent, including, for example, information for the customer and customer service agent, a time stamp, a service category or issue identification, a telephone number for use in subsequent customer support requests, and any of a variety of other suitable information as has been described. The data in the linking data store 420 may be structured for suitable display via a browser and/or content access application by an administrator, such as in the form of an electronic page or electronic site with a graphical user interface for interacting with, modifying, creating or deleting data.

The data store may also include a customer information data store 425. The customer information data store 425 may include contact information, demographic information, preferences, a purchase history, viewing history, customer support history, and any of a wide variety of other types of data which may be useful in providing customer support or in linking the customer to a customer service agent.

The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The system may include an analysis module 450 that may perform machine learning operations on customer support requests to optimize the predetermined period of time for re-connection of customers with customer service agents for different issues or service categories, to optimize routing of requests to the appropriate customer service agent and so forth.

The system may include a model builder module 455. The model builder module 455 may use output from the analysis module 450 to create a model for use implementing the linking data store and re-connections of customers with customer service agents. The learned model may be stored in the data store, such as in the customer information data store 425, for example. When the learned model performs at a desired performance level for a subset of users, such as accurately predicting a useful period of time for allowing re-connections between customers and customer service agents for a service category, the model may be subsequently deployed across a larger set of users.

The model builder module 455 may be configured to personalize the model to particular user interests, such as based on the data included in the history/preferences data store. In other words, the model builder may personalize the model based on a customer profile, customer preferences, purchase history and so forth.

Machine learning may be an effective tool for use in optimizing pattern recognition and rule generation. Machine learning may take empirical data as input, such as data from the support history, user preferences, and so forth and may yield patterns or new linking rules (e.g., predictions) which may be representative of the underlying mechanism, user thought or interaction process that resulted in the generation of the data. Machine learning systems may take advantage of data to capture characteristics of interest having an unknown underlying probability distribution. Machine learning may be used to identify possible relations between observed variables, such as aspects of user interaction with respect to orders, devices and so forth. Machine learning may also be used to recognize complex patterns and make machine decisions based on input data. In some examples, machine learning systems may generalize from the available data to produce a useful output, such as when the amount of available data is too large to be used efficiently or practically.

Machine learning may be performed using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive Bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub-symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure.

Client devices 470 may access data, content pages, messages and so forth via the computing device 410 over a network 465. Example client devices 470 may include, but are not limited to, a desktop computer, a laptop, a tablet, a mobile device, a television, a cell phone, a smart phone, a hand held messaging device, a set-top box, a gaming console, a personal data assistant, an electronic book reader, heads up display (HUD) glasses, a car navigation system, or any device with a display 485 that may receive and present the message content.

Customers may be identified when accessing the customer service server via various methods, such as a unique login and password, a unique authentication method, unique identifying information such as an email address or phone number, an Internet Protocol (IP) address of the user's computer, an HTTP (Hyper Text Transfer Protocol) cookie, a GPS (Global Positioning System) coordinate, or using similar identification methods. A customer may have an account with the server, service or provider, which may optionally track customer preferences, profile information and so forth.

The system may be implemented across one or more computing device(s) 410, connected via a network 465. For example, a computing device 410 may include a data store and various engines and/or modules such as those described above and such modules may be executable by a processor of the computing device.

The modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various embodiments, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various applications and/or functional entities described. The components executed on the computing device may include the modules described, as well as various other applications, services, processes, systems, engines or functionality not discussed in detail herein.

The client devices shown in FIG. 4 are representative of a plurality of client devices 470 that may be coupled to the network 465. The client devices 470 may communicate with the computing device over any appropriate network, including an intranet, the Internet, a cellular network, a local area network (LAN), a wide area network (WAN), a wireless data network or a similar network or combination of networks.

Each client device 470 may include a respective display 485. The display 485 may comprise, for example, one or more devices such as cathode ray tubes (CRTs), liquid crystal display (LCD) screens, gas plasma based flat panel displays, LCD projectors, or other types of display devices, etc.

Each client device 470 may be configured to execute various applications such as a browser 475, a respective page or content access application 480 for an electronic retail store and/or other applications. The browser 475 may be executed in a client device 470, for example, to access and render content pages, such as web pages or other network content served up by the computing device 410 and/or other servers. The content access application 480 may be executed to obtain and render for display content features from the server or computing device, or other services and/or local storage media.

In some embodiments, the content access application 480 may correspond to code that is executed in the browser 475 or plug-ins to the browser 475. In other embodiments, the content access application 480 may correspond to a standalone application, such as a mobile application. The client device may be configured to execute applications beyond those mentioned above, such as, for example, mobile applications, email applications, instant message applications and/or other applications. Users at client devices 470 may access content features through content display devices or through content access applications 480 executed in the client devices 470.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Various embodiments of the present technology may be used in environments other than the customer support examples provided above. For example, some embodiments may be used for instructional purposes, such as a classroom or online learning environment. A student may utilize a support application with similar functionality as the customer support application described above, for connecting and re-connecting with other students, faculty and so forth. Other embodiments of the present technology may be utilized in any other context in which one or more user computing devices or communication devices communicate with one or more support computing devices or communication devices via one or more one-way or two-way communication channels.

Figure 5:
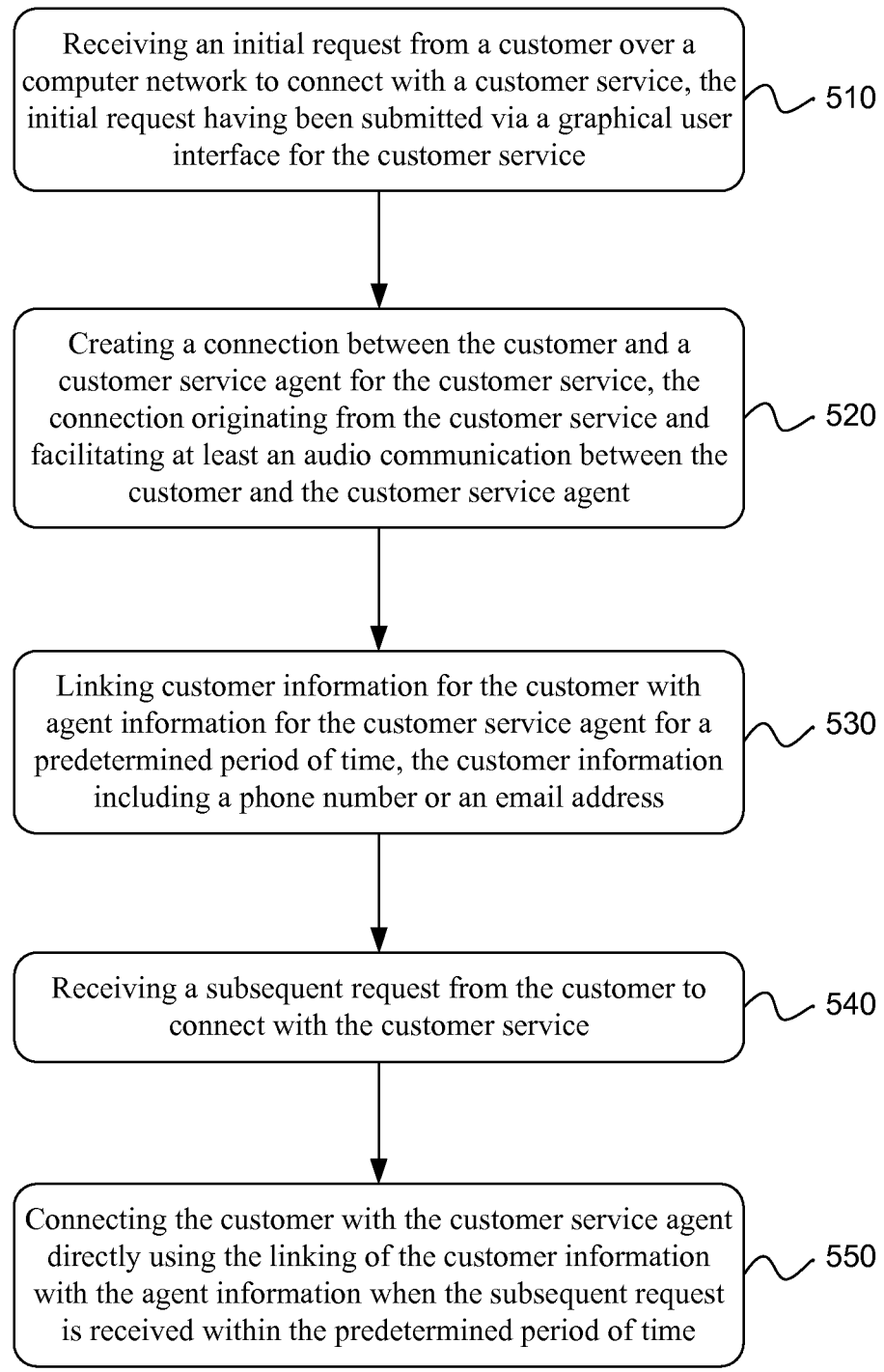
FIGS. 5-6 are flow diagrams for methods of connecting a customer with a customer service agent in accordance with examples of the present technology.
Figure 6:
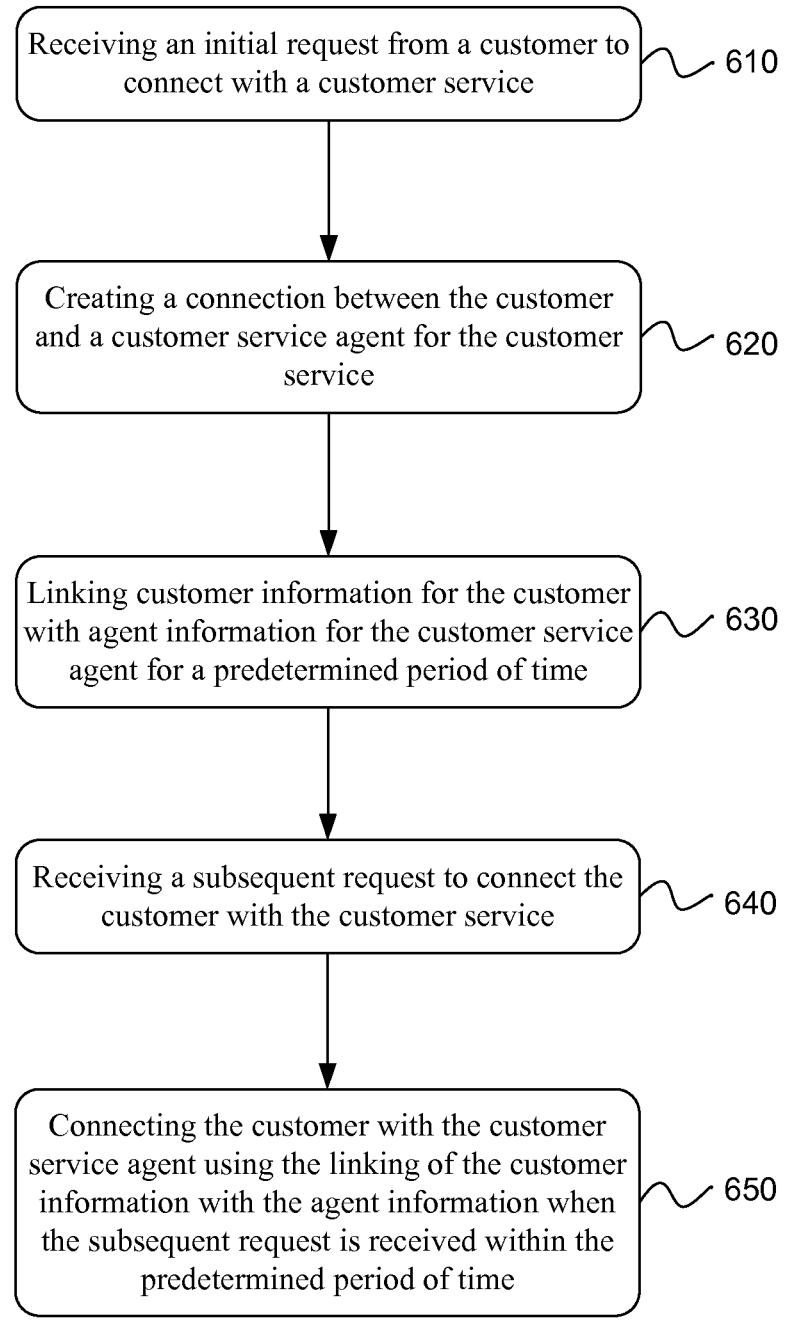

FIGS. 5-6 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring now to FIG. 5, a flow diagram of a method is illustrated for connecting a customer with a customer service agent in accordance with an example of the present technology. The method may include receiving 510 an initial request from a customer over a computer network to connect with a customer service agent. The initial request may have been submitted via a graphical user interface for the customer service or customer service server for a customer service center, via telephone or any using any other suitable request submission method. The method may include creating 520 a connection between the customer and the customer service agent through a customer service server, telephone network, or the like. The connection may be a data connection, voice connection, or any other suitable connection type. The connection may optionally originate from the customer service server or customer service center and facilitate at least an audio communication between the customer and the customer service agent. In some examples, the connection may provide for text communications, voice communications, video communications, and/or any other type of communication connection.

The method may include linking 530 customer information for the customer with agent information for the customer service agent for a predetermined period of time. The customer information used to link the customer with the customer service agent may be unique identifying information which is involved in the request for customer support, such as an IP address, a device identifier, a phone number, an email address and so forth. The agent information may include a phone number, identification number, name, or the like. The customer information and the agent information may be linked together by storing the customer information and the agent information together in a linking data store as a linked pair. Additional data, such as context of the communication, the predetermined period of time, and so forth may also be stored in the linking data store with the linked pair or may be stored elsewhere and be referenced by the linked pair.

The method may include receiving 540 a subsequent request from the customer to connect with the customer service server and connecting 550 the customer with the customer service agent directly using the linking of the customer information with the agent information when the subsequent request is received within the predetermined period of time. For example, the customer may submit the subsequent request when the initial request did not fully resolve the issue raised in the initial request or the customer may desire to request additional assistance that may differ in scope from assistance requested in the initial request.

Additional example details, operations, options, variations, etc. that may be part of the method have been described previously herein and/or are described in further detail below. Various systems, devices, components, modules and so forth for implementing the method may also be used, as described with respect to the various examples included in this disclosure.

In a further aspect of the method, the subsequent request may be submitted via the graphical user interface, the customer information may be the email address, and the connection may further facilitate or include a video communication between the customer and the customer service agent, such as using a networked video stream, or a camera included in a mobile device, for example. In one aspect, the video communication may be asymmetrical in that a video of the customer service agent may be provided to the customer but a video of the customer may not be transmitted to the customer service agent. However, a video of the display or user interface of a customer device may be transmitted to the customer service agent while a video of the display or user interface of the customer service agent device may not be transmitted to the customer.

The method may include creating the connection over a telephone network and receiving the subsequent request over the telephone network using the customer support agent information, which may include a customer support agent telephone number. Specifically, the subsequent request may be received as a result of input of the agent telephone number by the customer. In a further aspect of the method, the agent telephone number may expire after the predetermined period of time or the association of the customer information with the agent telephone number may expire after the predetermined period of time.

In one example, the method may provide an option for customers to remember a customer service agent. For example, if a customer held a video conference with a customer service agent and felt the customer service agent was pleasant and helpful, the customer may select an option to record (i.e., electronically store) a reference to the customer service agent for a subsequent request in order to attempt to be re-connected with the customer service agent for the subsequent request, whether the issue with the subsequent request is related to the initial issue or not. Permitting customers to record a reference for a customer service agent and re-connect with customer service agents may permit improved evaluation of an aspect of performance of the customer service agents. Customer service agents with many customer recordings or selections may exhibit more desirable customer support performance traits than customer service agents with few customer recordings or selections over a similar period of time.

In a further example, while the initial connection may originate from the customer service server, the subsequent connection may originate from the customer. Because the customer service server may have any number of outbound connections queued for customers who may not be waiting at or on a telephone or other device for the connection to be established, when an inbound connection or request is received from a customer, such as by a customer dialing an customer service agent direct number, the inbound connection may be given priority over the outbound connections.

Referring now to FIG. 6, a flow diagram of a method for connecting a customer with a customer service agent is illustrated in accordance with an example of the present technology. The method may include receiving 610 an initial request from a customer to connect with a customer service server and creating 620 a connection between the customer and a customer service agent for the customer service server. Customer information for the customer may be linked 630 with agent information for the customer service agent for a predetermined period of time. The method may further include receiving 640 a subsequent request to connect the customer with the customer service server and connecting 650 the customer with the customer service agent using the linking of the customer information with the agent information when the subsequent request is received within the predetermined period of time.

Similarly as mentioned in the description of the method illustrated in FIG. 5, additional example details, operations, options, variations, etc. that may be part of the method illustrated in FIG. 6 have been described previously herein and/or are described in further detail below. Various systems, devices, components, modules and so forth for implementing the method may also be used, as described with respect to the various examples included in this disclosure.

In one example implementation of the method, the initial request may be received from the customer via a computer network and the connection back to the customer may be created by the customer service server via a telephone network. In this example, the method may include assigning or distributing a phone number to the customer to enable access to the customer service agent by the customer for the predetermined period of time. The phone number may be a temporary phone number and the method may include expiring the phone number after the predetermined period of time.

Alternatively, the method may include redirecting the subsequent request to a different customer service agent when the subsequent request is received after the predetermined period of time has elapsed. The different customer service agent may simply be a redirection of the subsequent request to be fielded by the next available customer service agent. In many instances, the subsequent customer service agent will be different than the initial customer service agent after the predetermined period of time has expired. However, due to chance, the initial customer service agent may be the next available customer service agent to provide customer support for the customer.

In another example implementation, the initial request may be received via a telephone network using a telephone number and the subsequent request may be received using the telephone number of the initial request. The customer service server may recognize the customer according to a phone number and/or other identifier and route the customer to the initial customer service agent if the predetermined period of time has not expired.

Various types of information may be used to identify the customer and/or to link a customer with a customer service agent. For example, the customer information may be a device identifier of a device used by the customer to connect with the customer service server. In another example, the customer information may be a customer identifier associated with a customer account, such as a customer account number, email address, telephone number or the like. The agent information may be a telephone number, an agent identifier, such as an employee number or phone extension, and so forth.

In a specific example, the initial request may be received via a user interface of a mobile device and the connection may be an audio-video conference including screen and rights sharing of the mobile device with the customer service agent. In other words, the customer service agent may be enabled to remotely view what is displayed on the customer's mobile device display and may be able to remotely interact with the customer's mobile device, including any applications installed on the mobile device.

In another example, the subsequent request in the method may originate from the customer service server after a set time interval from termination of the connection resulting from the initial request, such as when a device power is cycled off and back on in a trouble-shooting or problem-solving approach to resolving the customer's issue.

While many aspects of the present technology have been discussed in terms of involvement of telephone calls or telephone numbers, the technology may be implemented using any of a variety of communication technologies or combinations of communication technologies. In one example, the initial request may be received from the customer via a computer network and the connection may be created by the customer service server via a computer network. Subsequent connections may be via the computer network, a telephone network and so forth.

Figure 7:
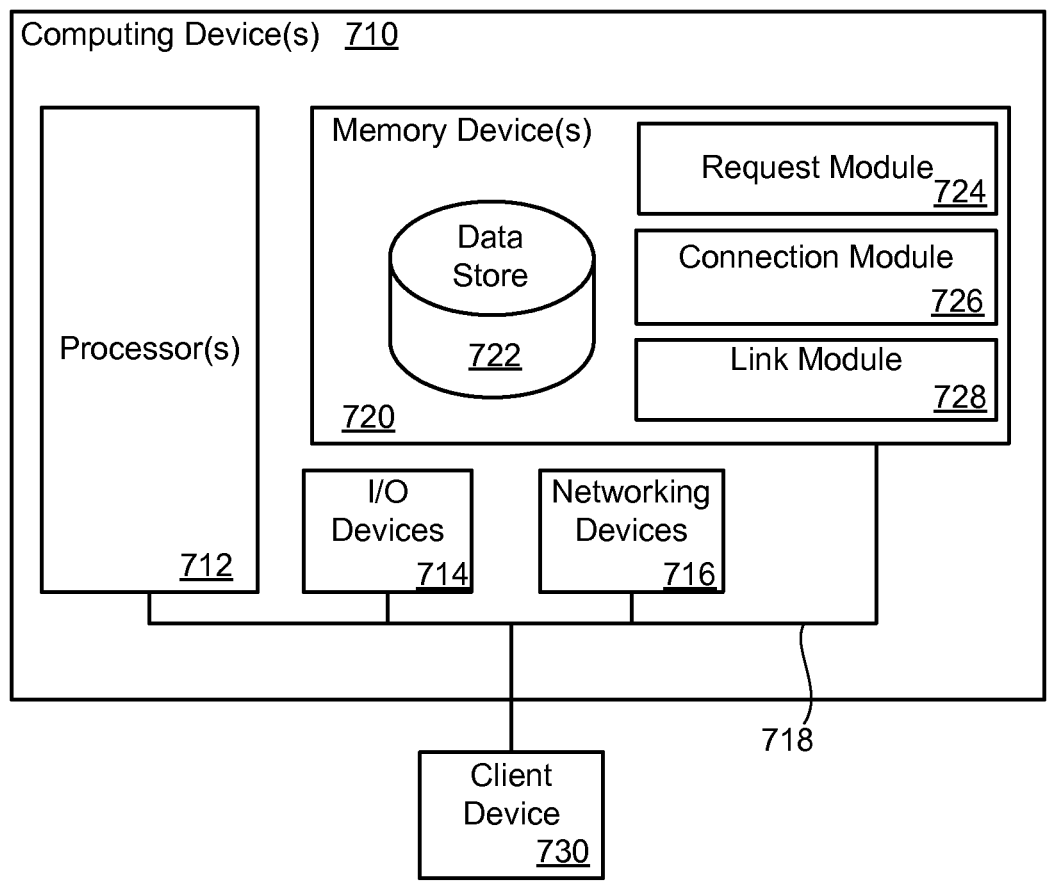
FIG. 7 is a block diagram of a computing system for customer service connection in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules (i.e., request module 724, connection module 726, link module 728) that are executable by the processor(s) and data for the modules. A data store 722 may also be located in the memory device 720 for storing data related to the modules and other applications along with an operating system that is executable by the processor(s) 712.

The computing device 710 may further include or be in communication with a client device 730, which may include a display device. The client device 730 may be available for an administrator to use in interfacing with the computing device 710, such as to review or make improvements to machine learning models or linked data and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A method, comprising:

receiving, via one or more computing devices associated with a customer service center computing system, an initial request from a customer device over a computer network to connect with a customer service agent device, the initial request having been submitted via a graphical user interface associated with the customer service center;

causing a connection to be created between the customer device and the customer service agent device associated with the customer service center computing system in response to the initial request, the connection being an outbound connection to the customer device originating from at least one of the one or more computing devices associated with the customer service center computing system and facilitating at least an audio communication between the customer device and the customer service agent device;

linking, via at least one of the one or more computing devices, customer information for the customer device with agent information for a customer service agent associated with the customer service agent device for a predetermined period of time, the customer information including a customer identifier;

receiving, via at least one of the one or more computing devices, a subsequent request from the customer device over the computer network to connect with the customer service agent device, the subsequent request having been submitted via a graphical user interface including a selectable option to enable indication that the subsequent request is related to the initial request;

causing the customer device to be connected with the customer service agent device using the linking of the customer information with the agent information when the subsequent request is received within the predetermined period of time and when appropriate based on a context of the subsequent request, the context being indicative of a relationship of the subsequent request to the initial request, wherein the context is weighted such that the context gradually becomes less indicative of the relationship of the subsequent request to the initial request as time passes, and wherein the context comprises: whether there is an intervening request between the initial request and the subsequent request, whether an intervening purchase was made between the initial request and the subsequent request, or an identification of whether the customer device used for the initial request is a same device as used for the subsequent request; and causing the customer to be connected with a different customer service agent when the subsequent request is received within the predetermined period of time and the context is appropriate for the different customer service agent.

2. The method of claim 1, the subsequent request having been submitted via the graphical user interface associated with the customer service center and the customer information being an email address, the connection further facilitating a video communication between the customer device and the customer service agent device.

3. The method of claim 1, further comprising causing the connection to be created over a telephone network.

4. A computer implemented method, comprising:
receiving, via one or more computing devices, an initial request from a customer over a computer network to connect with a customer service agent;

causing, via at least one of the one or more computing devices, an outbound communication connection from the at least one of the one or more computing devices to be created between the customer and the customer service agent in response to the initial request, the communication connection originating from at least one of the one or more computing devices;

linking, via the at least one of the one or more computing devices, customer information for the customer with agent information for the customer service agent for a predetermined period of time;

receiving a subsequent request to connect the customer with the customer service agent; and causing, via at least one of the one or more computing devices, the customer to be connected with the customer service agent using the linking of the customer information with the agent information when the subsequent request is received within the predetermined period of time and based on a context of the subsequent request, the context being indicative of a relationship of the subsequent request to the initial request based on whether there is an intervening request between the initial request and the subsequent request, whether an intervening purchase was made between the initial request and the subsequent request, or whether the customer device used for the initial request is a same device as used for the subsequent request; or causing the customer to be connected with a different customer service agent when the subsequent request is received within the predetermined period of time and based on the context.

5. The method of claim 4, wherein the initial request is received from the customer via a computer network and the communication connection is caused to be created by at least one of the one or more computing devices via a telephone network.

6. The method of claim 5, further comprising assigning a phone number to the customer, via at least one of the one or more computing devices, to enable access to the customer service agent by the customer for the predetermined period of time.

7. The method of claim 6, the method further comprising causing the phone number to expire after the predetermined period of time.

8. The method of claim 6, further comprising redirecting the subsequent request to a different customer service agent when the subsequent request is received after the predetermined period of time has elapsed.

9. The method of claim 4, wherein the initial request is received via a telephone network using a telephone number and the subsequent request is received using the telephone number of the initial request.

10. The method of claim 4, wherein:
the customer information comprises a device identifier or a customer identifier associated with a customer account,
the agent information comprises a telephone number or an agent identifier associated with the customer service agent, and
linking comprises linking the customer account with the customer service agent by associating the device identifier or the customer identifier with the telephone number or the agent identifier.

11. The method of claim 4, further comprising proactively electronically monitoring, via at least one of the one or more computing devices, a customer device following the initial request and within the predetermined period of time, and wherein receiving the subsequent request comprises receiving the subsequent request from at least one of the one or more computing devices to re-connect the customer with the customer service agent when an issue with the customer device is identified through the monitoring.

12. The method of claim 4, wherein the predetermined period of time is predetermined based on a context of the initial request or the communication connection, the predetermined period of time being variable between different contexts and being modifiable by the customer service agent.

13. The method of claim 4, wherein the initial request is received via a user interface of a mobile device and the communication connection comprises an audio-video conference including screen and rights sharing of the mobile device with the customer service agent.

14. The method of claim 4, wherein the subsequent request originates from a customer service center after a set time interval from termination of the communication connection resulting from the initial request.

15. The method of claim 4, wherein the initial request is received from the customer via a computer network and the communication connection is caused to be created by at least one of the one or more computing devices via the computer network.

16. A non-transitory computer-readable medium comprising computer-executable instructions which, when executed by a processor, implement a system comprising:
- a request module to receive an initial request from a customer to connect with a customer service agent;
- a connection module to cause a connection to be created between the customer and a customer service agent in response to the initial request, the connection being an outbound connection to the customer and originating from the system; and
- a link module to link customer information of the customer with agent information of the customer service agent for a predetermined period of time;
- wherein the connection module is configured to re-connect the customer with the customer service agent when a subsequent request is received within the predetermined period of time and based on a context of the subsequent request, the context being indicative of a relationship of the subsequent request to the initial request based on whether there is an intervening request between the initial request and the subsequent request, whether an intervening purchase was made between the initial request and the subsequent request, or whether a customer device used for the initial request is a same device as used for the subsequent request, the connection module being further configured to connect the customer with a different customer service agent when the subsequent request is received within the predetermined period of time and based on the context.

17. The system of claim 16, wherein the agent information is an agent telephone number, the system further comprising a number module to associate the agent telephone number with the customer service agent when the connection is created and to dissociate the agent telephone number from the customer service agent when the predetermined period of time expires.

18. The system of claim 16, further comprising a proactivity module to submit the subsequent request to re-connect the customer with the customer service agent when the customer is experiencing device issues with a customer device or when the customer is repeatedly performing a same action in interacting with a web page or the customer device.

* * * * *